United States Patent
Kim

(10) Patent No.: US 7,352,813 B2
(45) Date of Patent: Apr. 1, 2008

(54) PVR-SUPPORT VIDEO DECODING SYSTEM

(75) Inventor: Eung Tae Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 756 days.

(21) Appl. No.: 10/629,683

(22) Filed: Jul. 30, 2003

(65) Prior Publication Data

US 2004/0022313 A1    Feb. 5, 2004

(30) Foreign Application Priority Data

Jul. 30, 2002    (KR)    ................. 10-2002-004961

(51) Int. Cl.
*H04N 7/18*    (2006.01)

(52) U.S. Cl. .................... 375/240.25; 375/240.25

(58) Field of Classification Search ..........................
375/240.01–240.29
See application file for complete search history.

(56) References Cited

U.S. PATENT DOCUMENTS 7,110,659 B2 *   9/2006   Fujie et al.    ................... 386/46

* cited by examiner

*Primary Examiner*—Anand Rao
(74) *Attorney, Agent, or Firm*—Birch, Stewart, Kolasch & Birch, LLP

(57) ABSTRACT

An MPEG video decoding system with a PVR (Personal Video Recorder) function is disclosed. By applying the PVR function to an MPEG-2 decoder chip, which is the standard recommendation of the digital video transmission field, diverse high-performance PVR services such as video storage and search using an HDD application in the video decoder chip can be used, and two HD-class displays can simultaneously be supported. Also, the features of the video TS bitstream stored through the video decoding chip having a proposed PVR engine can be extracted in real time, and the playback or trick play of the stored video contents can be diversely and easily performed. According to the PVR-support video decoding system, an improved storage and search function of a video bitstream, and diverse video services can be provided, and the added value of the digital video recorder can be heightened.

32 Claims, 7 Drawing Sheets

PVR-SUPPORT VIDEO DECODING SYSTEM

This application claims the benefit of the Korean Application No. P 2002-44961 filed on Jul. 30, 2002, which is hereby incorporated by reference.

BACKGROUND OF THE INVENTION

1. Field of the Invention

The present invention relates to an MPEG video decoding system with a PVR (Personal Video Recorder) function which is applied to the application fields of a digital TV (television receiver) or a digital video recorder.

2. Discussion of the Related Art

In the field of home appliances such as a digital TV, an MPEG (Moving Picture Experts Group) encoder is used in order to reduce storage and transmission capacity of a digital video or audio. Especially, the digital TV or an STB (Set-Top Box) provides various services of a PVR, and a storage medium used for such services is being changed from an analog type such as the existing VTR (Video Tape Recorder) to a digital type such as an HDD (Hard Disc Drive). Also, there is an increasing demand for a digital TV having a function of processing TV input signals of two or more channels such as a PIP (Picture-In-Picture) function, POP (Picture-On-Picture) function, etc.

The prior art appliances relating to the PVR function have been proposed as follows:

U.S. Pat. No. 6,215,526 assigned to TiVo Company first discloses a PVR device which encodes an analog signal to a digital signal and then stores the digital signal in an HDD by video-tagging the digital signal.

U.S. Pat. No. 6,351,596 discloses a PVR appliance which stores programs according to a user's preference based on a CPU (Central Processing Unit). This PVR appliance stores the program in the unit of a scene according to VBI (Vertical Blank Interval) data or a tagged code such as a code block and so on.

U.S. Pat. No. 6,327,418 discloses a function capable of separating digital data into a video segment, an audio segment, an MPEG system stream, etc., storing the divided data in a cache, and rapidly reproducing the video data at a predetermined rate through a cache control.

U.S. Pat. No. 6,324,338 assigned to replay TV discloses a system for using an integrated channel guide so as to store TV programs suitable for users' criteria.

According to the above-described techniques, however, in the case of simultaneously viewing high-quality images of two channels, viewing a TV program while storing another TV program corresponding to another channel, or viewing a TV program stored through a time shift function, respective chips, which satisfy various types of functions, should separately be prepared or should be used in combination.

Especially, the PVR chip and the video decoding chip are separately designed to perform the PVR function and the video decoding function, respectively, and this causes the system cost to increase and the system integration to deteriorate.

SUMMARY OF THE INVENTION

Accordingly, the present invention is directed to a PVR-support video decoding system that substantially obviates one or more problems due to limitations and disadvantages of the related art.

An object of the present invention is to provide a PVR-support video decoding system which can reduce the system cost and heighten the system integration by integrating a PVR chip and a video decoding chip into a system.

Another object of the present invention is to provide a PVR-support video decoding system which can support the viewing of two-channel TV programs and a PVR function, and efficiently perform the storage and search of an MPEG bitstream in an HDD.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a PVR-support video decoding system includes a TS (Transport) decoder for decoding a video PES (Packetized Elementary Stream) from an input TS bitstream to output the decoded video PES, a video decoder for variable-length-decoding the video PES outputted from the TS decoder, and restoring the video PES to pixel values of an original picture through an IQ (Inverse Quantization) process, an IDCT (Inverse Discrete Cosine Transform) process, and an MC (Motion Compensation) process, and a PVR (Personal Video Recorder) engine for storing the TS bitstream in a storage medium, extracting video features from the video PES and storing the video feature in the storage medium in the form of meta data, and supporting a search and playback of the TS bitstream stored in the storage medium, wherein the TS decoder, the video decoder, and the PVR engine are constructed in a single MPEG-2 decoder.

Here, the TS decoder includes a first TS decoder for selecting one of a plurality of channel signals and a PVR input signal outputted from the PVR engine according to a selection signal inputted by a user, TS-decoding the selected signal, and outputting the decoded signal to the video decoder, and a second TS decoder for selecting one of the plurality of channel signals according to the selection signal inputted by the user, TS-decoding the selected signal, and outputting the decoded signal to the video decoder and the PVR engine.

The second TS decoder outputs the TS-decoded video PES to the PVR engine along with the TS bitstream of the selected channel. The PVR engine stores the TS bitstream in the storage medium as it is, and extracts the video features from the video PES and stores the video features in the storage medium in the form of meta data.

The storage medium may be an HDD.

The PVR engine includes a video feature extractor for extracting error correction information, header information and macroblock information from the video PES outputted through the TS decoder, analysis characteristics of a video sequence, and then outputting analyzed information, an index engine for storing the TS bitstream outputted through the TS decoder and the analyzed information extracted by the video feature extractor in the storage medium, and a search engine for searching for and displaying the TS bitstream and the analyzed information stored in the storage medium.

The video feature extractor includes a PES decoder for parsing only a video ES (Elementary Stream) from the video PES outputted through the TS decoder, a variable-length decoder for variable-length-decoding the video ES, an error detector for detecting information on a syntax error and a bit-stream error of the present video ES from an output of the variable-length decoder, a header extractor for extracting header information in the video sequence from the output of the variable-length decoder, a DC extractor for extracting DC components in macroblocks from the output of the variable-length decoder, an MV (Motion Vector) extractor for extracting corresponding motion vector information of the respective macroblocks through decoding of motion vectors outputted from the variable-length decoder, and a video analyzer for detecting whether a thumbnail image is generated and whether a scene is changed by analyzing the detected error information, the header information, the DC components and the MV information, and then outputting the detected information to the index engine and the search engine along with the analyzed information.

The TS decoder detects an error of the TS bitstream and outputs an error indication signal, and the vide analyzer confirms a property of the error using an output of the error detector and the error indication signal, and controls to reset values of internal buffers and registers of the video feature extractor or to find next slices or sequences according to the property of the error.

The video analyzer, if a picture coding type extracted by the header extractor is an I-picture, detects the change of the scene by obtaining a frame difference and a DC histogram from DC components of the I-picture, and generates a thumbnail image.

The video analyzer, if a picture coding type extracted by the header extractor is an I-picture, prepares a memory for storing the DC components extracted by the DC extractor, and stores only DC values or an average value of the DC values of any one of four luminance blocks included in the macroblock, and DC values of Cb and Cr blocks.

The video analyzer estimates brightness of the image from the DC histogram information, and if a dark screen is detected, it does not generate the thumbnail image.

In the case that the dark screen is not detected, the video analyzer generates the thumbnail image through a horizontal-line duplication of the DC values stored in the memory if the input bit-steam corresponds to a field picture, while it generates the thumbnail image using the DC values stored in the memory as they are if the input bitstream corresponds to a frame picture.

The video analyzer, if the picture coding type extracted by the header extractor is a P-picture, detects the change of the scene and estimates an amount of motion of an object in the P-picture by extracting histogram information of a forward motion vector in an integer-pel unit and histogram information of the macroblock type.

The video analyzer, if the picture coding type extracted by the header extractor is a B-picture, estimates an amount of motion of an object in the B-picture by extracting only histogram information of the macroblock type.

The index engine stores respective analyzed information outputted from the video analyzer in the storage medium in the form of meta data, while it adds a time stamp to the TS bitstream outputted through the TS decoder, scrambles the TS bitstream, and stores the scrambled TS bitstream in the storage medium.

The search engine reads out the TS bitstream from the storage medium, removes a time stamp from the TS bitstream, descrambles the TS bitstream, and then outputs the descrambled TS bitstream to the TS decoder.

In another aspect of the present invention, a PVR-support video decoding system includes a first TS decoder for selecting one of a plurality of channel signals and a PVR (Personal Video Recorder) input signal outputted from an HDD, decoding a video PES (Packetized Elementary Stream) from a TS (Transport) bitstream of a selected signal, and outputting the decoded video PES, a second TS decoder for selecting one of the plurality of channel signals, decoding the video PES from the TS bitstream of the selected signal, and outputting the decoded video PES along with the TS bitstream, a video decoder for variable-length-decoding the video PES outputted from the first and second TS decoders, and restoring the video PES to pixel values of an original picture through an IQ (Inverse Quantization) process, an IDCT (Inverse Discrete Cosine Transform) process, and an MC (Motion Compensation) process, a video feature extractor for extracting error correction information, header information and macroblock information from the video PES outputted through the second TS decoder, analysis characteristics of a video sequence, and then outputting analyzed information, an index engine for storing the TS bitstream outputted through the second TS decoder and the analyzed information extracted by the video feature extractor in the HDD, a search engine for reading out the TS bitstream stored in the HDD to output the readout TS bitstream to the first TS decoder, and simultaneously controlling a playback and a trick play by searching for the analyzed information stored in the HDD, and an IDE (Integrated Drive Electronics) interface for controlling an input/output of data and control signals among the index and search engines and the HDD, wherein the first and second TS decoders, the video decoder, the video feature extractor, the index and search engines, and the IDE interface are constructed in a single MPEG-2 decoder chip.

Here, the PVR-support video decoding system further includes a channel selection unit for outputting a channel selection signal to the first and second TS decoders according to a user's request, and by controlling input paths of the first and second TS decoders using the channel selection signal outputted from the channel selection unit, the system performs a single display which enables a real-time viewing of one channel, a viewing of a time-shifted TS bitstream, a watch & record which enables viewing of one channel program while storing of another channel program in the HDD, and a dual display which enables simultaneous viewing of two channel programs on one screen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
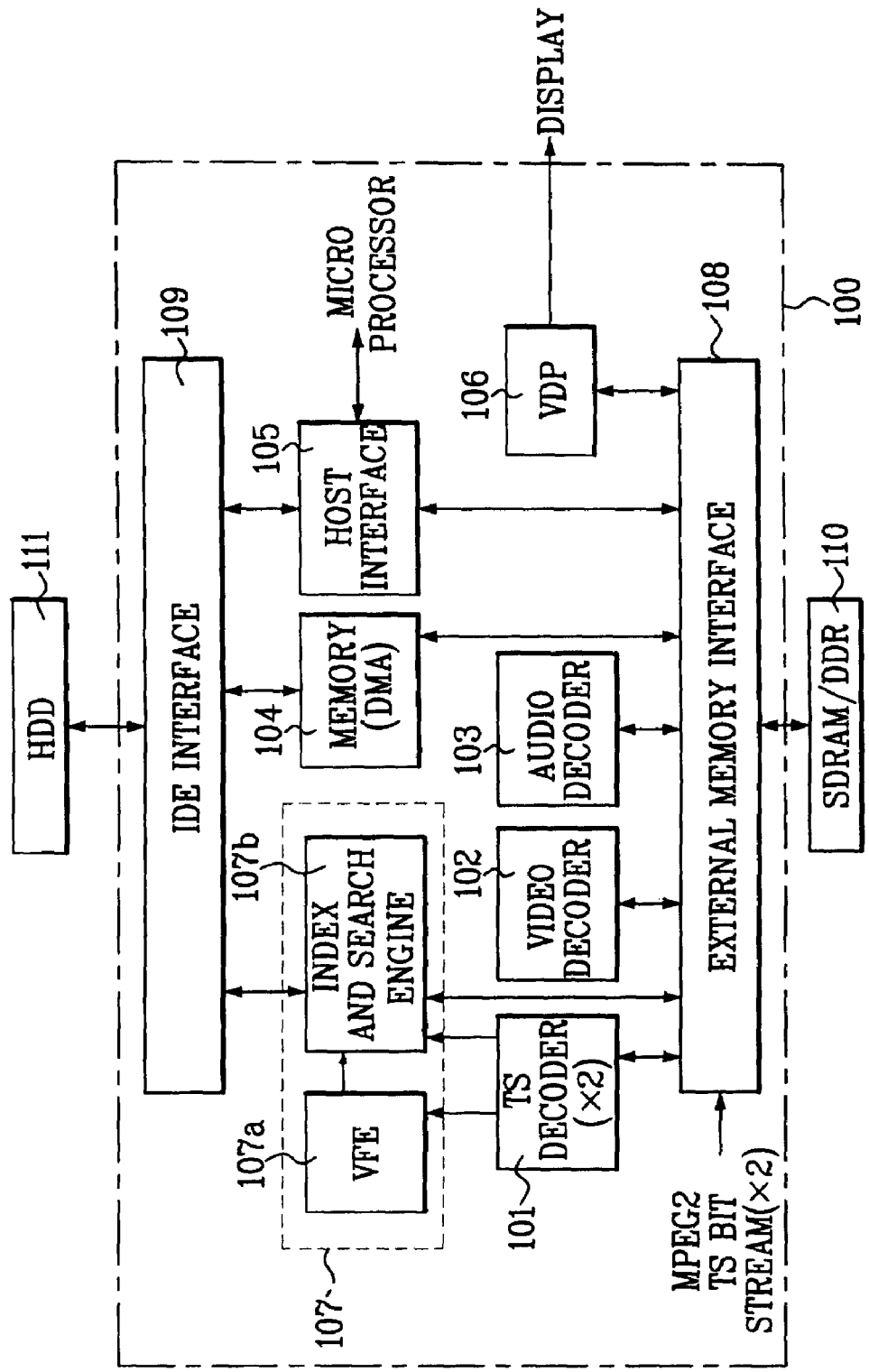
FIG. 1 illustrates a block diagram of a PVR-support video decoding system according to the present invention.

FIG. 1 illustrates a block diagram of a PVR-support video decoding system according to the present invention.

The PVR-support video decoding system includes an MPEG-2 decoder part 100, an external memory 110, and an HDD 111.

The MPEG-2 decoder part 100 includes two TS (Transport) decoders 101, a video decoder 102, an audio decoder 103, a VDP (Video Display Processor) 106, a PVR engine 107 for supporting the storage and search functions, an external memory interface 108 for controlling an input/output of control signals and data between the MPEG-2 decoder part 100 and the external memory 110, and an IDE (Integrated Drive Electronics) or EIDE (Enhanced Integrated Drive Electronics) interface 109 for an input/output of control signals and data between the MPEG-2 decoder part 100 and the HDD 111.

The IDE interface 109 connects the HDD to a PC (Personal Computer), and large-capacity storage devices such as the HDD, a CD-ROM drive, a tape drive, etc., are connected to the PC using the IDE interface. In the present invention, the IDE interface is used to connect the PVR engine 107 in the video decoder chip to the HDD 111.

The external memory 110 may be an SDRAM (synchronous DRAM) or a DDR (Double Data Rate) SDRAM.

Here, the reference numeral 104 denotes a DMA (Direct Memory Access) memory unit, and 105 denotes a host interface.

The PVR engine 107 includes a VFE (Video Feature Extraction) unit 107a for extracting features of a video signal outputted through the two TS decoders 101, and an index and search engine 107b for storing the bitstream in the HDD 111 or searching for video stream stored in the HDD 111. The index engine of the index and search engine 107b is related to a storage position during storing the video stream, and the search engine is for searching for and displaying the stored bitstream.

The present invention as constructed above provides various services such as a display of an HD-class video, a watch & record function, etc., using only two TS decoders 101.

The two TS decoders 101 have the same construction and function, and one of them decodes the PES (Packetized Elementary Stream) of the audio and video to match the PID (Program ID) of a desired channel among the MPEG-2 TS bitstream inputted through the external memory interface 108.

That is, since the transmitted MPEG-2 video, audio, and data bitstream are multiplexed, the TS decoder 101 divides the MPEG-2 TS bitstream into an MPEG-2 video PES, an audio PES, and a data PES. The divided video PES is decoded by the video decoder 102, and the audio PES is decoded by the audio decoder 103 to be outputted to a screen or a speaker. At this time, the video is displayed on the screen through the VDP (Video Display Processor) 106, which supports functions corresponding to various kinds of input/output display format conversion, an OSD (On-Screen Display), and a graphic.

The host interface 105 performs a control and function support with respect to the MPEG-2 decoder part 100.

The PVR engine 107 can perform the read/write of the TS bitstream in the HDD 111 through the IDE (or EIDE) interface 109 under the control of the external CPU. Also, the PVR engine can support the search and diverse trick plays of the TS bitstream stored in the HDD 111 at a desired time.

Figure 2:
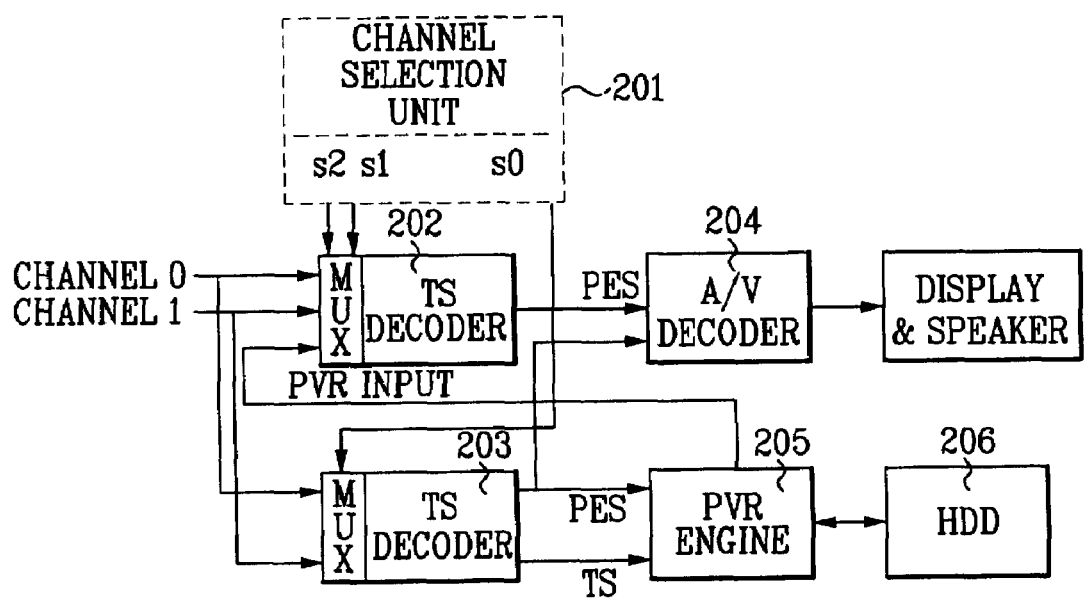
FIG. 2 illustrates an example of the whole data paths of the TS bitstream in the PVR-support video decoding system according to the present invention.

FIG. 2 shows data paths of the TD bitstream for providing various services such as a simultaneous display of two HD-class videos and a watch & record function using the two TS decoders 101, a host interface and a multiplexer.

Referring to FIG. 2, the system includes a channel selection unit 201 for outputting a channel selection signal under the control of the host, a first TS decoder 202 which includes a multiplexer for selecting any one of input signals according the channel selection signal S2 and S1 from the channel selection unit 201 and TS-decoding the selected signal, and a second TS decoder 203 which includes a multiplexer for selecting any one of input channels according the channel selection signal S0 from the channel selection unit 201 and TS-decoding the selected channel, an audio/video decoder 204 for receiving and decoding the video and audio PESs outputted from the first and second TS decoders 202 and 203, and outputting the decoded video and audio to the display unit and the speaker, and a PVR engine 205 for receiving and storing an output of the second TS decoder 203 in an HDD 206 to perform a search, and outputting the PVR data read out from the HDD 206 to the first TS decoder 202. Here, the PVR engine 205 is the same as the PVR engine 107 of FIG. 1, and the HDD 206 is the same as the HDD 111 of FIG. 1. Also, the audio/video decoder 204 corresponds to the video decoder 102 and the audio decoder 103, and the first and second TS decoders 202 and 203 correspond to the TS decoders 101 of FIG. 1.

In the embodiment of FIG. 2, the first TS decoder 202 receives two channel signals and PVR data through the PVR engine 205, and the second TS decoder 204 receives two channel signals. However, the present invention is not limited to this embodiment. In other words, the second TS decoder 203 may receive the PVR data, and a designer can make other modifications.

Here, the two channel signals mean the HD-class TS bitstreams, and are simultaneously inputted to the first and second TS decoders 202 and 203, respectively. Also, the host can provide various services as shown in Table 1 below by changing input paths using three input selection bits S2, S1 and S0 of the channel selection unit 201. At this time, the second TS decoder 203 outputs two kinds of data, i.e., the video PES and the video TS, to the PVR engine 205 with respect to the channel signal selected by the channel selection signal. The PVR engine 205 extracts the video features from the video PES and stores the extracted video features in the HDD 206 as meta information, and directly stores the video TS in the HDD 206.

TABLE 1

Diverse display service types by a host selection

| TYPE | S2 | S1 | S0 | Video Display 1 | 2 | PVR ON | OFF | Note |
|---|---|---|---|---|---|---|---|---|
| 1 | 0 | 0 | 0 | Ch #0 | | | Ch #0 | single display |
| 2 | 0 | 1 | 1 | Ch #1 | | | Ch #1 | single display |
| 3 | 1 | 0 | 0 | PVR | | | Ch #0 | time shift |
| 4 | 1 | 0 | 1 | PVR | | | Ch #1 | time shift |
| 5 | 0 | 0 | 1 | Ch #0 | | | Ch #1 | watch & record |
| 6 | 0 | 1 | 0 | Ch #1 | | | Ch #0 | watch & record |
| 7 | 0 | 0 | 1 | Ch #0 | Ch #1 | | Ch #1 | dual display |
| 8 | 0 | 1 | 0 | Ch #1 | Ch #0 | | Ch #0 | dual display |

In the case of FIG. 2, it is assumed that the vide decoder can basically reproduce up to two HD-class videos. Recently, with the development of the semiconductor process, the operating frequency of the chip can be heightened up to 166 MHz, and the memory bandwidth of the external memory 110 can be increased to the level of a DDR SDRAM. Consequently, in the case of using a DDR memory of 162 MHz as the external memory 110, the decoding of two HD-class videos can be performed.

In Table 1, the case of TYPE-1 or TYPE-2 corresponds to a single video decoding and display. That is, it corresponds to the real-time viewing of the TS bitstream of a desired channel without storing it in the HDD 206. The case of TYPE-1 corresponds to the real-time viewing of the program of channel 0, and the case of TYPE-2 corresponds to the real-time viewing of the program of channel 1. Also, the program of the same channel can be viewed in real time as well as it can be stored in the HDD 206.

TYPE-3 or TYPE-4 corresponds to the case of viewing a time-shifted TS bitstream, and in this case, the viewer can reproduce the program stored in the HDD after a certain time elapses. Also, it is possible to reproduce the program previously recorded. In the case of the TYPE-3, the program of channel 0 can be time-shifted, while in the case of the TYPE-4, the program of channel 1 can be time-shifted.

TYPE-5 or TYPE-6 corresponds to the watch & record function which enables the viewing of the present TV program with the simultaneous recording of another channel program. That is, TYPE-5 corresponds to the case of viewing the TS bitstream of channel 0 in real time while storing the TS bitstream of channel 1 in the HDD 206. TYPE-6 corresponds to the case of viewing the program of channel 1 while storing the program of channel 0 in the HDD 206.

TYPE-7 or TYPE-8 corresponds to the case of viewing programs of two paths in real time after stopping the storage and search of the TS bitstream. As shown in FIG. 2, the audio/video PESs outputted from the first and second TS decoders 202 and 203 are inputted to the A/V decoder 204. At this time, the input format is in the form of a PES, and the programs are displayed in the form of a double screen or a PIP. In this case, the channel program selected through the second TS decoder 203 can be viewed and simultaneously stored in the HDD 206.

Consequently, as shown in FIG. 2, by controlling the paths of the input terminals of the two TS decoders using three-bit selection signals S2, S1 and S0, diverse services can be provided through only the two TS decoders.

Figure 3:
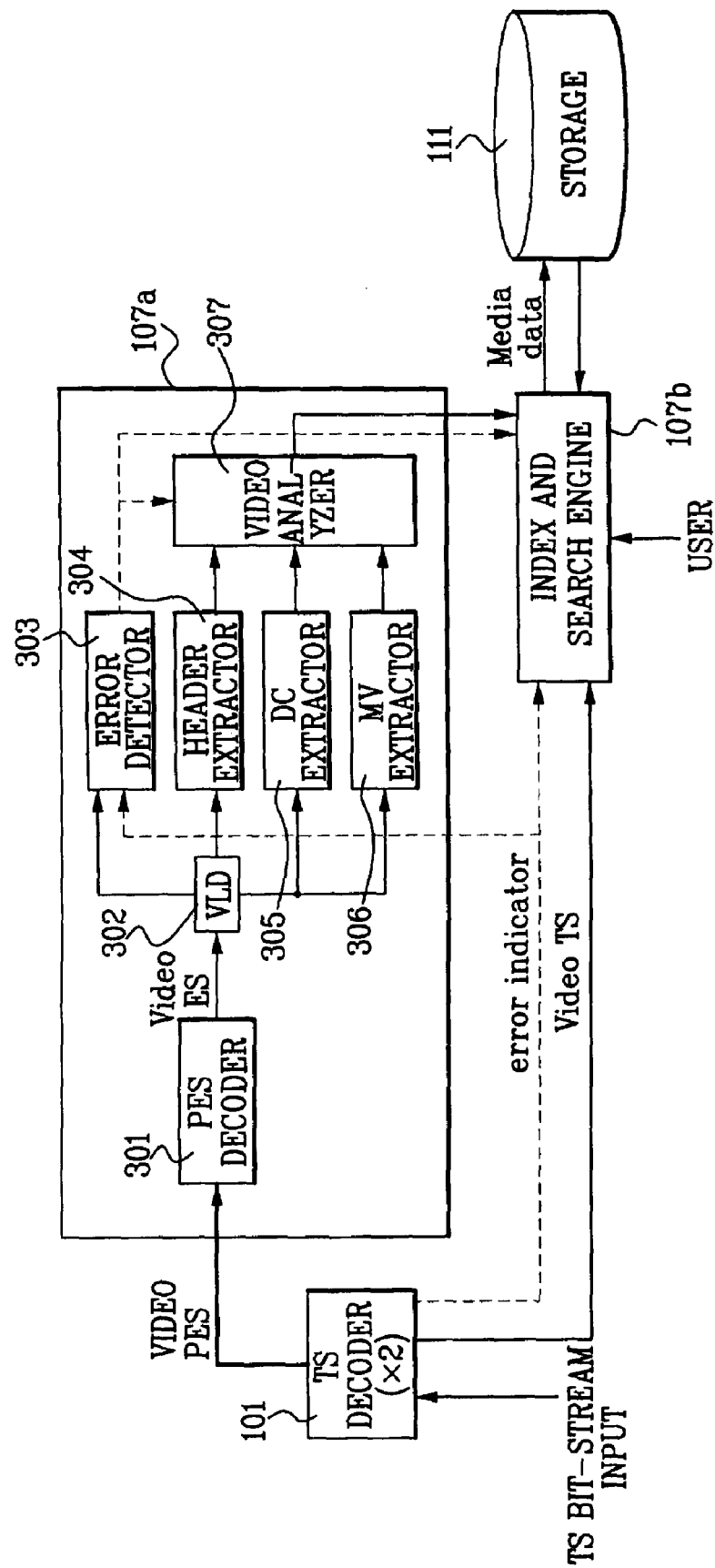
FIG. 3 illustrates a block diagram of an example of the VFE engine of FIG. 1.

FIG. 3 is a block diagram illustrating the detailed construction of the PVR engine 107 for storing the TS bitstream in the HDD 111 through the TS decoder 101 according to the present invention, which includes a VFE engine 107a, and an index and search engine 107b.

The VFE engine 107a, which extracts the features of the video by decoding the video PES inputted from the TS decoder 101, includes a PES decoder 301 for parsing only a video ES (Elementary Stream) from the video PES, a variable-length decoder (VLD) 302 for variable-length-decoding the video ES, an error detector 303 for detecting an error from an output of the VLD 302, a header extractor 304 for extracting a header from the output of the VLD 302, a DC extractor 305 for extracting DC components from the output of the VLD 302, an MV (Motion Vector) extractor 306 for extracting motion vectors from the output of the VLD 302, and a video analyzer 307 for detecting whether a thumbnail image is generated and whether a scene is changed by analyzing the detected error, the header, the DC and the MV information, and then outputting the detected information to the index and search engine 107 along with the analyzed information.

The VFE engine 107a as constructed above extracts the features of the video contents, and uses the features as information for supporting a fast forward, a reverse play, a shot detection, a scene segmentation, an intelligent playback, etc. Also, the VFE engine 107a generates a thumbnail image, and uses it to present the representative image of the video sequence.

In operation, the TS decoder 101 first decodes and transmits the TS bitstream to the PES decoder 301 of the VFE engine 107a in the form of a video PES. Then, the PES decoder 301 parses the video ES from the video PES, and outputs the video ES to the VLD 302. The VLD 302 variable-length-decodes the input video ES, and outputs the decoded video ES to the error detector 303, the header extractor 304, the DC extractor 305, and the MV extractor 306, so as to analyze the video sequence by extracting the header information in the MPEG sequence (for example, a sequence header and a picture header) and macro-block information (for example, DC and MV information) is detected.

That is, the header extractor 304 extracts and outputs to the video analyzer 307 the header information of the video sequence, i.e., parameters of the size of an image, bit rate, frame rate, progressive sequence, picture coding type, temporal reference, progressive frame, macroblock type, motion information, etc.

The DC extractor 305 extracts the DC components of the macroblock, that is, four DC components in the case of luminance, and two DC components in the case of chrominance (i.e., Cb and Cr), and outputs the extracted DC components to the video analyzer 307. At this time, in order to generate a thumbnail image and so on, a representative DC value or an average DC value may be extracted and outputted with respect to four luminance blocks of the macroblock, and two DC values may be extracted and outputted with respect to two chrominance (i.e., Cb and Cr) blocks.

The MV extractor 306 extracts and outputs to the video analyzer 307 corresponding motion vector information of the respective macroblock through a motion vector decoding. At this time, the MV extractor 306 extracts only the motion vectors in the unit of an integer-pel except for half-pel motion information. Also, the MV extractor 306 extracts only forward motion vector information with respect to the P-picture.

Meanwhile, the error detector 303 extracts information on a syntax error and a bit-stream error of the present video ES. At this time, since the TS decoder 101 detects the error of the TS bitstream and transmits an error indicator signal, the error detector 303 and the index and search engine 107b can recognized the error of the TS bitstream. Consequently, the video analyzer 307, if the error is detected, controls to reset values of internal buffers and registers of the VFE engine 107a or find next slices or sequences in accordance with the property of the error.

Also, since the index and search engine 107b, if an error is generated, controls so that any wrong bitstream is not stored in the HDD 111, only normal bitstreams are stored in the HDD 111. At this time, the index and search engine 107b manages a DB (Database) by converting time information of a portion where the error is generated into the form of meta data.

For example, if an error is generated in one TS packet, the index and search engine can control to store information on the next slice, i.e., a next TP packet or TS packet in which a sequence start code is included. In the case of storing the packets in the unit of a sequence as above, the index and search engine can control so that the previous packets ranging from the TS packet in which the error is generated to the TS packet having the next sequence start code are not stored.

Figure 4:
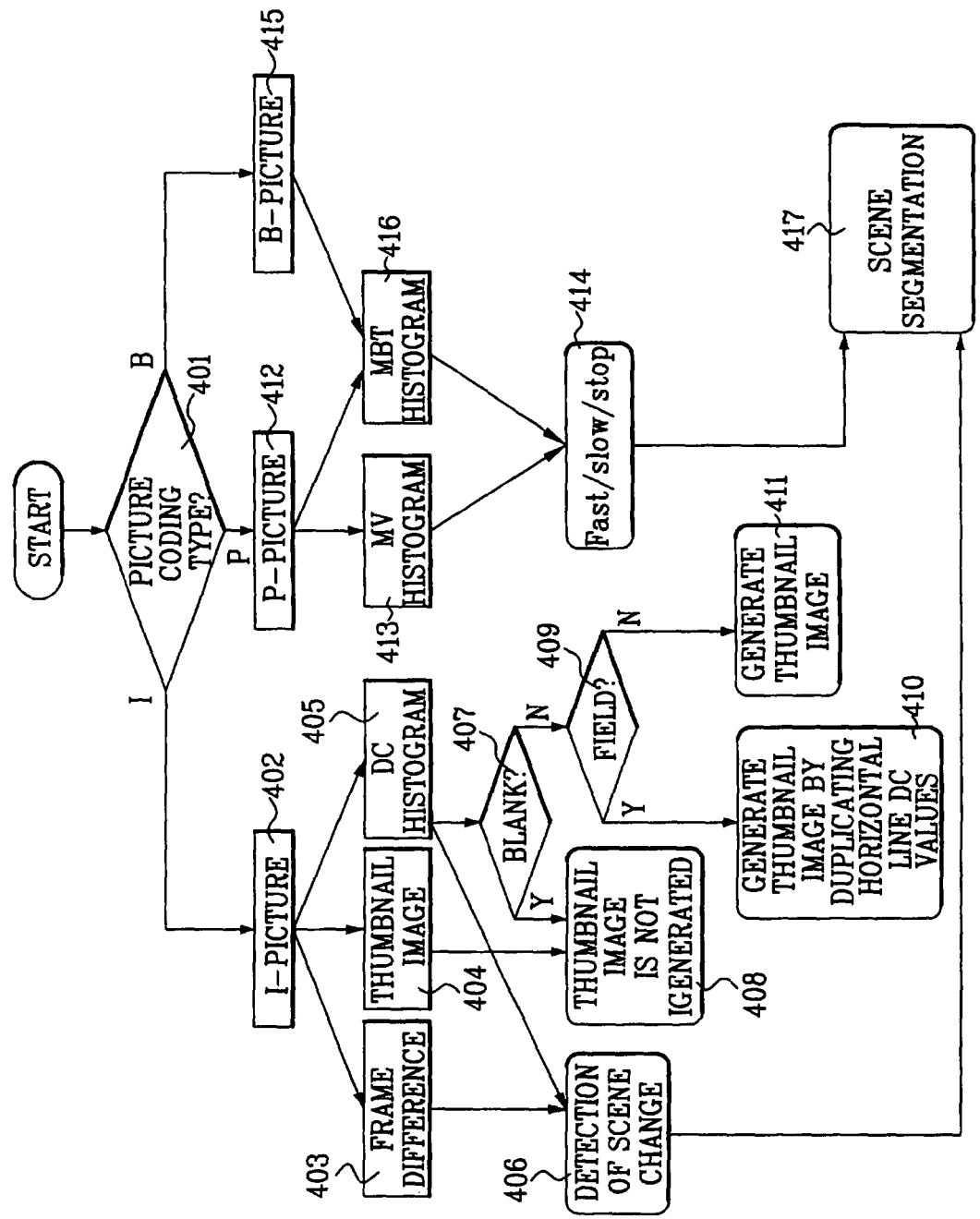
FIG. 4 illustrates a flowchart of a video analysis mechanism of the video analyzer of FIG. 3.

FIG. 4 illustrates a flowchart of a video analysis mechanism of the video analyzer 307 according to the present invention, which shows an example of generating a scene segmentation and thumbnail image. That is, the video analyzer 307 extracts different characteristics of the respective pictures in accordance with the picture coding type obtained from the header extractor 304 and uses them for the scene segmentation (401).

First, the video analyzer processes the DC image of the I-picture 402 in the form of a frame difference 403 between two I-pictures, a thumbnail image 404, and a DC histogram 405. Also, the video analyzer can detect the scene change using the frame difference and the DC histogram (406), and can determine whether to generate the thumbnail image by checking a blank through the DC histogram (407). If it is determined to be the blank, the video analyzer does not generate the thumbnail image (408), while if not, it checks if the present input picture is a field picture (409). If it is checked that the present picture is the field picture, the video analyzer generates the thumbnail image through the horizontal line duplication of the extracted DC values (410), and if it is checked that the present picture is the frame picture, the video analyzer generates the thumbnail image using the extracted DC values as they are (411).

Meanwhile, the video analyzer produces a MV histogram and a macroblock type histogram from the P-picture (413 and 416), produces only the macroblock type histogram from the B-picture 415 (416), and confirms whether the present input frame is fast, slow, or in a still state (414). Then, the video analyzer outputs the corresponding information to the scene segmentation 417 for the indexing and search (417).

In summary, in the case of the I-picture, no motion information exists, and thus the video analyzer extracts the image characteristics using only the DC values of the macroblock.

Figure 5:
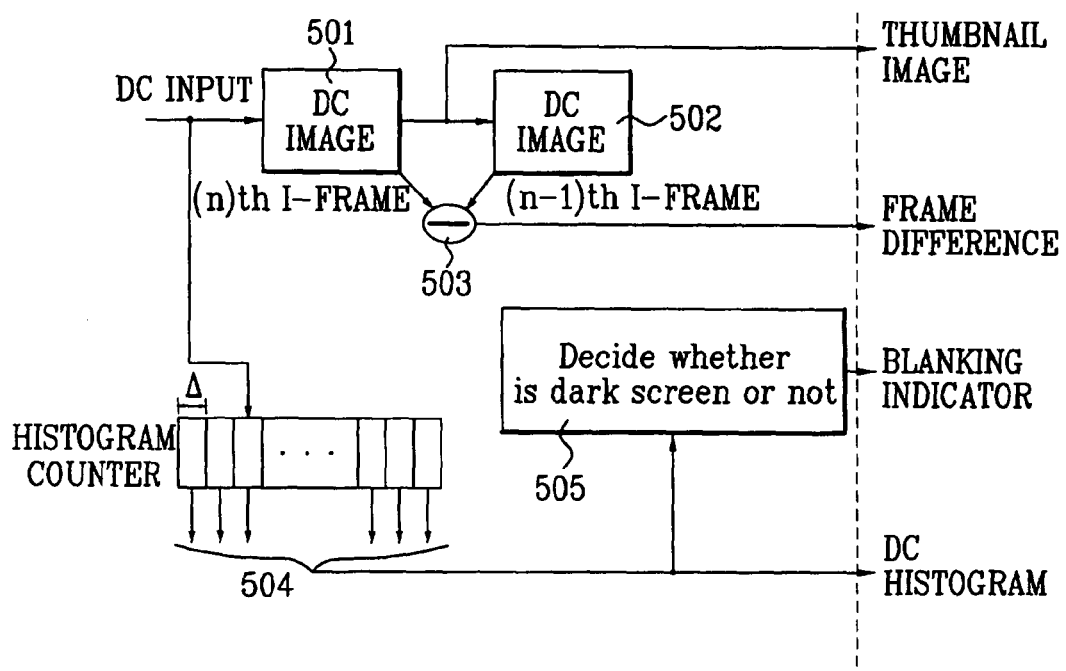
FIG. 5 illustrates an example of using DC image information through the video analyzer of FIG. 3.

FIG. 5 illustrates an example of obtaining DC information through the video analyzer 307 according to the present invention. First, the video analyzer stores only the DC components of the macroblock in the memory. That is, if the DC value of the n-th I-type frame is inputted from the DC extractor 305, the video analyzer stores the DC value of the (n−1)-th I-type frame, which was stored in a first memory 501, in a second memory 502, and stores the DC value of the presently inputted n-th I-type frame in the first memory 501.

In the case of the DC image of 1920×1080 pixels, for example, the luminance (Y) per macroblock has four DC values, and the chrominance (C) per macroblock has two DC values for Cb and Cr. At this time, the number of macroblocks of the whole image, i.e., a frame, is 8160 (120×68). Accordingly, the total number of bits of a DC image corresponding to a frame will be 120×68×6=48960 bytes. This requires a large amount of memory capacity, and also requires a large amount of calculation when the frame difference is calculated.

Accordingly, in the present invention, three DC values are stored for each macroblock when the DC values are stored in the first and second memories 501 and 502. That is, by storing three DC values, which is composed of one Y, one Cb and one Cr, for each macroblock, the amount of memory capacity and calculation can be reduced. At this time, in the case of the luminance, one DC value, which is obtained by averaging four DC values existing in the macroblock, may be generated and stored, or any one of the four DC values is selected and stored.

If so, the total number of bits of the DC image corresponding to a frame will be 24480 bytes. Here, the DC image is produced for the I-picture only, and this is used as the thumbnail image. That is, the DC image is used when a logo or a representative image of the TS bitstream presently stored is displayed.

The sum of an absolute difference between the DC images as produced above is obtained through a subtracter 504, and this is called a frame difference.

This frame difference is used for the detection of a scene change. That is, if the frame difference exceeds a preset value, it may be judged that the scene is changed.

Also, a DC histogram is obtained from the DC image in order to obtain information on the brightness or chrominance of the image. At this time, in order to reduce the size of the buffer for obtaining the DC histogram, a histogram counter 504 reduces the number of histogram bins through a quantization Δ. For example, if Δ is set to 30 in the state that the input pixel range is 0~255, the number of histogram bins can be reduced to 9.

Then, a dark screen decision unit 505 estimates the brightness of the image using the DC histogram information of the image obtained as above, i.e., a DC histogram distribution. If the most histogram bins represent pixel values near 0, this means a dark screen, and the thumbnail image of such images is insignificant.

Thus, in order to solve the problem that the representative image (for example, thumbnail image) of the video sequence represents a dark screen, the dark screen decision unit 505 outputs a blanking indicator signal for indicating that the DC images judged as the dark screen are blanking images, and thus the corresponding thumbnail image will not be generated.

Meanwhile, in the case that the DC image is not the blanking image, the thumbnail image may be generated. At this time, there is about a half size difference between the field picture and the frame picture. Since the field picture and the frame picture coexist in the MPEG video sequence, the size of the thumbnail image is frequently changed to cause the actual application thereof to be difficult. In order to solve this problem, the system according to the present invention generates the thumbnail image as producing the frame picture with the DC values duplicated with respect to horizontal lines in the case of the field picture. Thus, the system can maintain the representative images to have a constant size in one sequence.

Also, the system detects the scene change using the DC histogram bins outputted from the histogram counter 504 and the frame difference outputted from the subtracter 503. That is, the system can accurately detect a hard cut phenomenon or the scene change occurring in the case that the frame difference exceeds the predetermined values or the difference value between the color histograms exceeds the predetermined value.

Also, in the case of the P-picture, the histogram information of the forward motion vectors and the histogram information of MBT (Macroblock Type) are extracted and used for the detection of the scene change. That is, in the case of the P-picture, the MV histogram is extracted from the motion vectors in the unit of an integer-pel. Also, using the MV histogram and the MBT histogram, the amount of motion of an object in the P-picture can be estimated. That is, using the size information of the MV, it can be checked whether the change of the object in the image is great or not. At this time, in order to remove various uncertainties such as a rapid movement of a small object, a slow movement of a large object, etc., the histogram of the MBT is also used for the extraction of the movement change of the whole image.

Meanwhile, in the case of the B-picture, only the histogram of the MBT is extracted because of the increase of the memory capacity due to the storage of bi-directional MV information. Consequently, in the case of the B-picture, the amount of motion cannot accurately judged, but information on a motion area in the picture can be obtained. That is, using the MBT histogram, the motion area of the object in the B-picture can be estimated.

The video information obtained from the I, B and P-pictures as described above are stored in the HDD 111, the CPU uses the TS bitstreams stored in the HDD 111 in a trick play and so on. Specifically, various services such as the display of the picture in the unit of a video shot, the edit and playback of only the goal-scoring scenes in sports, the selective display of the core scenes in news, etc., can be provided.

The present invention provides hardware of the PVR engine which is capable of providing such services easily and promptly.

Figure 6:
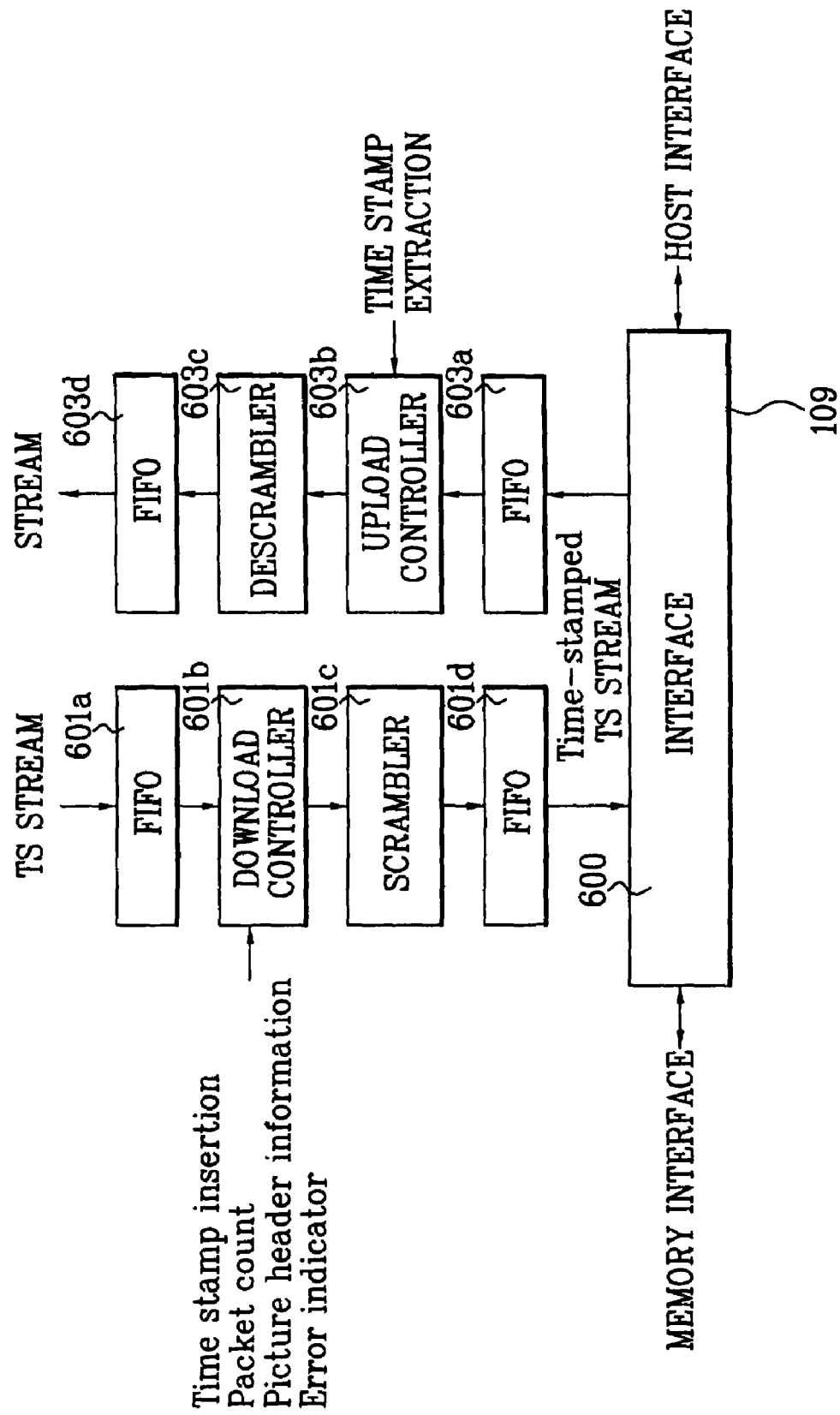
FIG. 6 illustrates a block diagram of an example of the index and search engines of the VFE engine of FIG. 1.

Meanwhile, FIG. 6 illustrates a block diagram of an example of the index and search engine 107 according to the present invention.

The path through which the input TS bitstream is stored in the HDD 111 is provided through the index engine as follows.

First, the TS bitstream outputted from the TS decoder 101 is stored in a FIFO (First-In First-Out) unit 601*a*, and then outputted to a download controller 601*b*. The download controller 601*b* attaches a time stamp in front of the TS packet read out from the FIFO unit 601*a*. Simultaneously, in counting the number of TS packets and storing the counted number in the HDD 111, meta data information on whether a sequence start exists or which pictures exist in the TS packet is stored in the HDD 111. At this time, for a copy protection during storing the time-stamped TS bitstream and the meta data information in the HDD 111, a scrambler 601*c* scrambles the TS stream having the time stamp attached thereto and the meta data information, and then stores the scrambled TS stream and meta data information in the HDD 111 through the FIFO unit 601*a* and an IDE interface 109.

As described above, the video signal is stored in the HDD 11 in the form of a TS bitstream, and at this time, the time stamp is attached to the TS packet, and for the copy protection, the TS bitstream is scrambled before it is stored.

Meanwhile, the reading of the TS bitstream stored in the HDD 11 is performed in the reverse order of the download process by the search engine. First, the search engine reads out the time-stamped TS bitstream from the HDD 111, and stores the readout time-stamped TS bitstream in a FIFO unit 603*a*. Then, an upload controller 603*b* adjusts an upload speed according to a user's movement, and removes the time stamp attached in front of the TS packet. That is, the upload controller 603*b* serves to control the buffer according to the reading speed of the TS bitstream from the HDD 111 as the user selects a trick play or a playback of the stored program.

The TS packet from which the time stamp is removed by the upload controller 603*b* is descrambled by a descrambing unit 603*c*, and is changed to the original TS packet. The TS bitstream descrambled by the descrambler 603*c* is inputted to the TS decoder 101 through the FIFO unit 603*d*.

Figure 7:
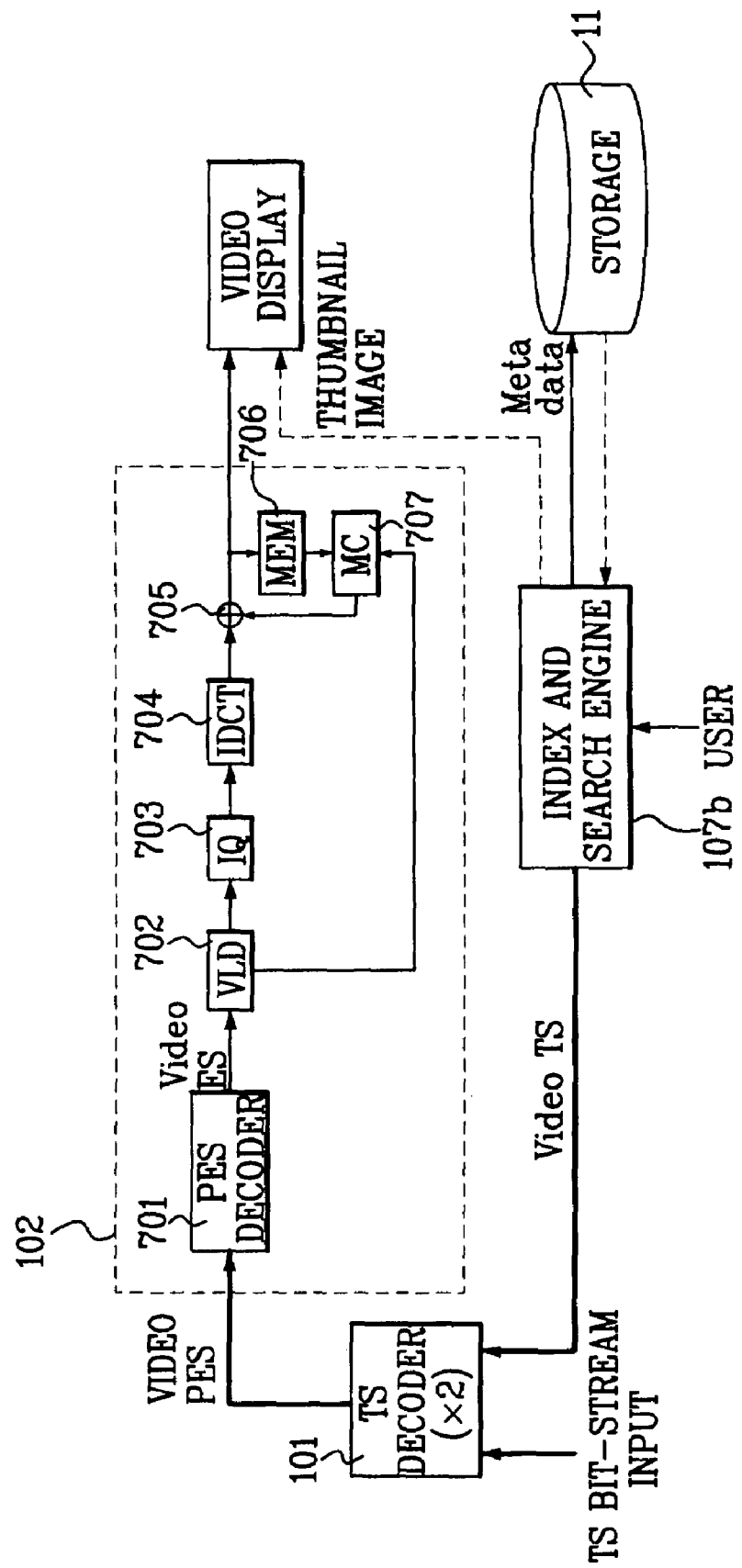
FIG. 7 illustrates a block diagram of an example of reproducing a program stored in the HDD through the search engine of FIG. 1.

FIG. 7 illustrates a block diagram of a path for searching the TS bitstream stored in the HDD 111 through the PVR engine 107 and displaying the searched TS bitstream.

That is, if the user selects a time shift function or a reproduction of the stored bitstream (i.e., playback or trick play), the host processor reads the TS bitstream from a specified position of the HDD 111, and transmits the TS bitstream to the index/search engine 107*b* through the IDE interface 110. Then, the TS bitstream successively passes through the FIFO unit 603*a*, the upload controller 603*b*, the descrambler 603*c*, and the FIFO unit 603*d*, and is inputted to the TS decoder 101.

The TS decoder 101 decodes the TS bitstream to a PES (Packetized Elementary Stream), and outputs the PES to the video decoder 102.

The video decoder 102 is a general MPEG-2 video decoder, and comprises a PES decoder 701, a VLD (Variable-Length Decoder) 702, an IQ (Inverse Quantization) unit 703, an IDCT (Inverse Discrete Cosine Transform) unit 704, an adder 705, a memory 706, and a motion compensation unit 707.

Specifically, the PES decoder 701 parses the video ES from the input video PES, and outputs the video ES to the VLD 702. The VLD 702 variable-length-decodes the input video ES to separate the video ES into motion vectors, quantization values, and DCT coefficients. The motion vectors are outputted to the motion compensation unit 707, and the DCT coefficients and the quantization values are outputted to the IQ unit 703.

The IQ unit 703 performs the inverse quantization of the DCT coefficients according to the input quantization value, and outputs the inversely quantized DCT coefficients to the IDCT unit 704. The IDCT unit 704 performs the IDCT with respect to the inversely quantized DCT coefficients, and outputs the IDCT-transformed DCT coefficients to the adder 705.

Meanwhile, the motion compensation unit 707 performs the motion compensation for the present pixel values using the motion vectors and the previous frame stored in the frame memory 706, and outputs the motion-compensated pixel values to the adder 705. The adder 705 adds the IDCT-transformed values and the motion-compensated values to restore to a complete image that is the final pixel value, and outputs the restored image to display the restored image.

At this time, the CPU may display a program guide for programs stored in the HDD 111 on a screen through the VDP 106.

Also, the CPU may process an EPG (Electronic Program Guide) and VFE obtained from the TS decoder 101 and data of the video features obtained from the index engine in the form of meta data, and store the processed data in the HDD 111.

Meanwhile, in the case of the thumbnail, the CPU stores the thumbnail images of the video sequence in a specified space of the HDD ill, and processes and displays them by software when the CPU displays the program guide.

Consequently, the present invention can support an improved PVR function by storing the TS bitstream of a program desired by a user in the HDD and obtaining the contents of the program through a PVR engine.

As described above, according to the PVR-support video decoding system according to the present invention, by applying the PVR function to an MPEG-2 decoder chip, which is the standard recommendation of the digital video transmission field, diverse high-performance PVR services such as video storage and search using an HDD application in the video decoder chip can be used, and two HD-class displays can simultaneously be supported.

Also, the features of the video TS bitstream stored through the video decoding chip having a proposed PVR engine can be extracted in real time, and the playback or trick play of the stored video contents can be diversely and easily performed. Consequently, according to the present invention, an improved storage of a video bitstream, search function and diverse video services can be provided, and the added value of the digital video recorder can be heightened.

The present invention is a basic technology which is essential to the application fields of a digital TV or a digital video recorder, and can provide a high-performance digital video decoder for storing and searching for video contents using an HDD with the technical competitiveness strengthened.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A PVR-support video decoding system comprising:
   a TS (Transport Stream) decoder for decoding a video PES (Packetized Elementary Stream) from an input TS bitstream to output the decoded video PES;
   a video decoder for variable-length-decoding the video PES outputted from the TS decoder, and restoring the video PES to pixel values of an original picture through an IQ (Inverse Quantization) process, an IDCT (Inverse Discrete Cosine Transform) process, and an MC (Motion Compensation) process; and
   a PVR (Personal Video Recorder) engine comprising:
      a video feature extractor for extracting error correction information, header information and macroblock information from the video PES outputted through the TS decoder, analysis characteristics of a video sequence, and then outputting analyzed information;
      an index engine for storing the TS bitstream outputted through the TS decoder and the analyzed information extracted by the video feature extractor in a storage medium; and
      a search engine for searching for and displaying the TS bitstream and the analyzed information stored in the storage medium,
   wherein the header information identifies a picture coding type and a temporal reference of the TS bitstream.

2. The system of claim 1, wherein the TS decoder comprises:
   a first TS decoder for selecting one of a plurality of channel signals and a PVR input signal outputted from the PVR engine according to a selection signal inputted by a user, TS-decoding the selected signal, and outputting the decoded signal to the video decoder; and
   a second TS decoder for selecting one of the plurality of channel signals according to the selection signal inputted by the user, TS-decoding the selected signal, and outputting the decoded signal to the video decoder and the PVR engine.

3. The system of claim 2, wherein the second TS decoder outputs the TS-decoded video PES to the PVR engine along with the TS bitstream of the selected channel; and
   wherein the PVR engine stores the TS bitstream in the storage medium as it is, and extracts the video features from the video PES and stores the video features in the storage medium in the form of meta data.

4. The system of claim 1, wherein the storage medium is an HDD.

5. The system of claim 1, wherein the video feature extractor comprises:
   a PES decoder for parsing only a video ES (Elementary Stream) from the video PES outputted through the TS decoder;
   a variable-length decoder for variable-length-decoding the video ES;
   an error detector for detecting information on a syntax error and a bit-stream error of the present video ES from an output of the variable-length decoder;
   a header extractor for extracting header information in the video sequence from the output of the variable-length decoder;
   a DC extractor for extracting DC components in macroblocks from the output of the variable-length decoder;
   an MV (Motion Vector) extractor for extracting corresponding motion vector information of the respective macroblocks through decoding of motion vectors outputted from the variable-length decoder; and
   a video analyzer for detecting whether a thumbnail image is generated and whether a scene is changed by analyzing the detected error information, the header information, the DC components and the MV information, and then outputting the detected information to the index engine and the search engine along with the analyzed information.

6. The system of claim 5, wherein the TS decoder detects an error of the TS bitstream and outputs an error indication signal; and
   wherein the video analyzer confirms a property of the error using an output of the error detector and the error indication signal, and controls to reset values of internal buffers and registers of the video feature extractor or to find next slices or sequences according to the property of the error.

7. The system of claim 5, wherein the index engine, if the error is detected through the output of the error detector and the error indication signal, controls so that any wrong TS bitstream is not stored in the storage medium, converts time information of a portion where the error is generated into a meta data form, and stores the converted time information in the storage medium.

8. The system of claim 5, wherein the video analyzer, if a picture coding type extracted by the header extractor is an I-type picture, prepares a memory for storing the DC components extracted by the DC extractor, detects the change of the scene by obtaining a frame difference and a DC histogram from DC components of the I-picture, and generates a thumbnail image.

9. The system of claim 8, wherein the video analyzer estimates brightness of the image from the DC histogram information, and if a dark screen is detected, the video analyzer does not generate the thumbnail image.

10. The system of claim 9, wherein, in the case that the dark screen is not detected, the video analyzer generates the thumbnail image through a horizontal-line duplication of the DC values stored in the memory if the input bitstream corresponds to a field picture, while the video analyzer generates the thumbnail image using the DC values stored in the memory as they are if the input bitstream corresponds to a frame picture.

11. The system of claim 5, wherein the video analyzer, if a picture coding type extracted by the header extractor is an I-picture, prepares a memory for storing the DC components extracted by the DC extractor, and stores DC values of any one of four luminance blocks included in the macroblock and DC values of Cb and Cr blocks.

12. The system of claim 5, wherein the video analyzer, if a picture coding type extracted by the header extractor is an I-picture, prepares a memory for storing the DC components extracted by the DC extractor, and stores an average value of DC values of any one of four luminance blocks included in the macroblock and DC values of Cb and Cr blocks.

13. The system of claim 5, wherein the video analyzer, if the picture coding type extracted by the header extractor is a P-picture, detects the change of the scene and estimates an amount of motion of an object in the P-picture by extracting histogram information of a forward motion vector in an integer-pel unit and histogram information of the macroblock type.

14. The system of claim 5, wherein the video analyzer, if the picture coding type extracted by the header extractor is a B-picture, estimates an amount of motion of an object in the B-picture by extracting only histogram information of the macroblock type.

15. The system of claim 1, wherein the index engine stores respective analyzed information outputted from the video analyzer in the storage medium in the form of meta data, while it adds a time stamp to the TS bitstream outputted through the TS decoder, scrambles the TS bitstream, and stores the scrambled TS bitstream in the storage medium.

16. The system of claim 1, wherein the search engine reads out the TS bitstream from the storage medium, removes a time stamp from the TS bitstream, descrambles the TS bitstream, and then outputs the descrambled TS bitstream to the TS decoder.

17. The system of claim 16, wherein the TS decoder parses the video PES from the TS bitstream outputted from the search engine, and outputs the parsed video PES to the video decoder.

18. The system of claim 1, wherein the search engine supports a fast forward, a reverse play, a shot detection, a scene segmentation, an intelligent playback, and a thumbnail image display using the meta information stored in the storage medium.

19. A PVR-support video decoding system of a digital television receiver having a HDD, comprising:
a first TS (Transport Stream) decoder for selecting one of a plurality of channel signals and a PVR (Personal Video Recorder) input signal outputted from the HDD, decoding a video PES (Packetized Elementary Stream) from a TS (Transport Stream) bitstream of a selected signal, and outputting the decoded video PES;
a second TS decoder for selecting one of the plurality of channel signals, decoding the video PES from the TS bitstream of the selected signal, and outputting the decoded video PES along with the TS bitstream;
a video decoder for variable-length-decoding the video PES outputted from the first and second TS decoders, and restoring the video PES to pixel values of an original picture through an IQ (Inverse Quantization) process, an IDCT (Inverse Discrete Cosine Transform) process, and an MC (Motion Compensation) process;
a video feature extractor for extracting error correction information, header information and macroblock information from the video PES outputted through the second TS decoder, analysis characteristics of a video sequence, and then outputting analyzed information;
an index engine for storing the TS bitstream outputted through the second TS decoder and the analyzed information extracted by the video feature extractor in the HDD;
a search engine for reading out the TS bitstream stored in the HDD to output the readout TS bitstream to the first TS decoder, and simultaneously controlling a playback and a trick play by searching for the analyzed information stored in the HDD; and
an IDE (Integrated Drive Electronics) interface for controlling an input/output of data and control signals among the index and search engines and the HDD.

20. The system of claim 19, further comprising a channel selection unit for outputting a channel selection signal to the first and second TS decoders according to a user's request;
wherein, by controlling input paths of the first and second TS decoders using the channel selection signal outputted from the channel selection unit, the system performs a single display which enables a real-time viewing of one channel, a viewing of a time-shifted TS bitstream, a watch & record which enables viewing of one channel program while storing of another channel program in the HDD, and a dual display which enables simultaneous viewing of two channel programs on one screen.

21. The system of claim 19, wherein the video feature extractor comprises:
a PES decoder for parsing only a video ES (Elementary Stream) from the video PES outputted through the second TS decoder;
a variable-length decoder for variable-length-decoding the video ES;
an error detector for detecting information on a syntax error and a bit-stream error of the present video ES from an output of the variable-length decoder;
a header extractor for extracting header information in the video sequence from the output of the variable-length decoder;
a DC extractor for extracting DC components in macroblocks from the output of the variable-length decoder;
an MV (Motion Vector) extractor for extracting corresponding motion vector information of the respective macroblocks through decoding of motion vectors outputted from the variable-length decoder; and a video analyzer for detecting whether a thumbnail image is generated and whether a scene is changed by analyzing the detected error information, the header information, the DC components and the MV information, and then outputting the detected information to the index engine and the search engine along with the analyzed information.

22. The system of claim 21, wherein the video analyzer confirms a property of the error outputted from the error detector, and controls to reset values of internal buffers and registers of the video feature extractor or to find next slices or sequences according to the property of the error.

23. The system of claim 21, wherein the index engine, if the error is generated, controls so that any wrong TS bitstream is not stored in the HDD, converts time information of a portion where the error is generated into a meta data form, and stores the converted time information in the HDD.

24. The system of claim 21, wherein the video analyzer, if a picture coding type extracted by the header extractor is an I- type picture, prepares a memory for storing the DC components extracted by the DC extractor, detects the change of the scene by obtaining a frame difference and a DC histogram from DC components of the I-picture, and generates a thumbnail image.

25. The system of claim 24, wherein the video analyzer estimates brightness of the image from the DC histogram information, and if a dark screen is detected, the video analyzer does not generate the thumbnail image.

26. The system of claim 25, wherein, in the case that the dark screen is not detected, the video analyzer generates the thumbnail image through a horizontal-line duplication of the DC values stored in the memory if the input bitstream corresponds to a field picture, while the video analyzer generates the thumbnail image using the DC values stored in the memory as they are if the input bitstream corresponds to a frame picture.

27. The system of claim 21, wherein the video analyzer, if a picture coding type extracted by the header extractor is an I-picture, prepares a memory for storing the DC components extracted by the DC extractor, and stores DC values of any one of four luminance blocks included in the macroblock and DC values of Cb and Cr blocks.

28. The system of claim 21, wherein the video analyzer, if a picture coding type extracted by the header extractor is an I-picture, prepares a memory for storing the DC components extracted by the DC extractor, and stores an average value of DC values of any one of four luminance blocks included in the macroblock and DC values of Cb and Cr blocks.

29. The system of claim 21, wherein the video analyzer, if the picture coding type extracted by the header extractor is a P-picture, detects the change of the scene and estimates an amount of motion of an object in the P-picture by extracting histogram information of a forward motion vector in an integer-pel unit and histogram information of the macroblock type.

30. The system of claim 21, wherein the video analyzer, if the picture coding type extracted by the header extractor is a B-picture, estimates an amount of motion of an object in the B-picture by extracting only histogram information of the macroblock type.

31. The system of claim 19, wherein the index engine stores respective analyzed information outputted from the video analyzer in the storage medium in the form of meta data, while it adds a time stamp to the TS bitstream outputted through the TS decoder, scrambles the TS bitstream, and stores the scrambled TS bitstream in the storage medium.

32. The system of claim 19, wherein the search engine reads out the TS bitstream from the storage medium, removes a time stamp from the TS bitstream, descrambles the TS bitstream, and then outputs the descrambled TS bitstream to the TS decoder.

* * * * *